Aug. 16, 1932.  J. E. MACHOLDA  1,871,540
HITCH FOR AUTOMOBILE TRACTORS AND THE LIKE
Filed Aug. 3, 1931
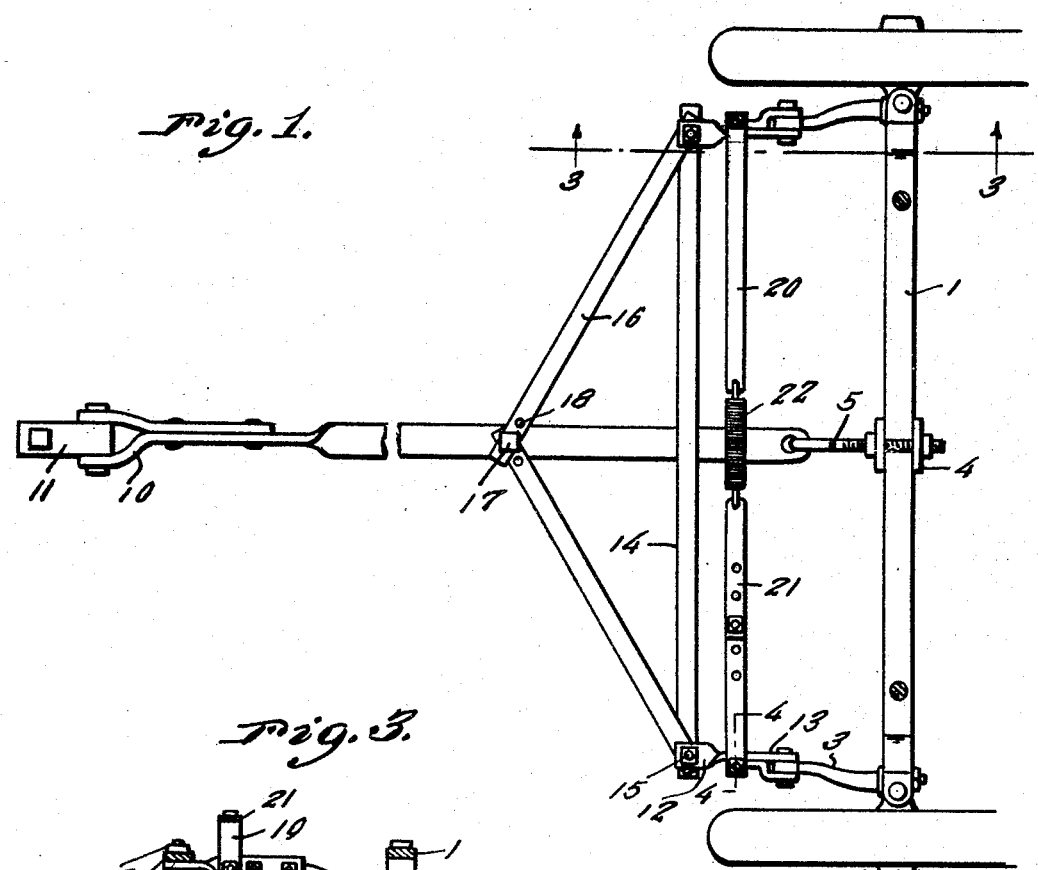
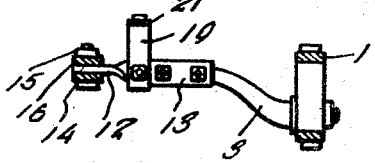
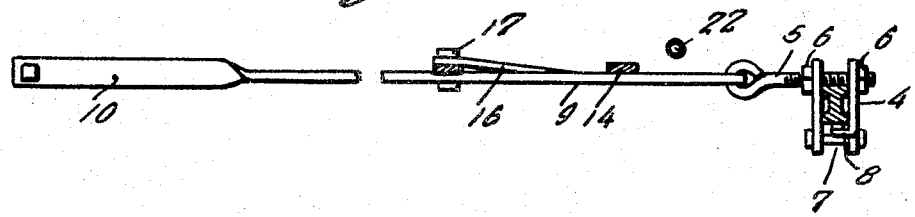
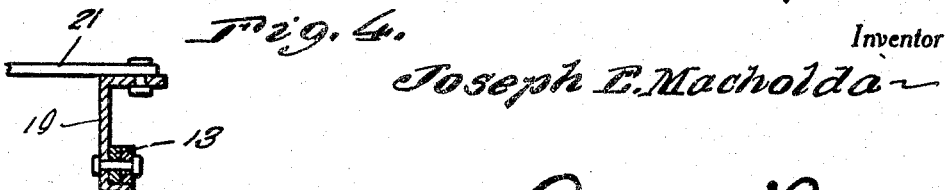
Inventor
Joseph E. Macholda
By Clarence A. O'Brien
Attorney Patented Aug. 16, 1932

1,871,540

UNITED STATES PATENT OFFICE

JOSEPH E. MACHOLDA, OF NORTH REDWOOD, MINNESOTA

HITCH FOR AUTOMOBILE TRACTORS AND THE LIKE

Application filed August 3, 1931. Serial No. 554,830.

This invention relates to a hitch for connecting a trailer to an automobile or one automobile to another, the general object of the invention being to provide a hitch which is extremely simple and sturdy, and one which eliminates shimmying and which has a pull from three points.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a plan view showing the hitch attached to a trailer, only the front axle and wheels of the trailer being shown.

Figure 2 is a longitudinal sectional view through Figure 1, parts in elevation.

Figure 3 is a section on line 3—3 of Figure 1.

Figure 4 is a section on line 4—4 of Figure 1, part of the cross bar being in edge view.

In this drawing the numeral 1 indicates the front axle of a trailer or automobile which has pintles pivotally connected to its end for carrying the wheels 2 and each spindle has an arm 3 connected therewith. A pair of clamping plates 4 receives the threaded part of an eye bolt 5, said eye bolt having the nuts 6 thereon which engage the plates as shown in Figures 1 and 2. A bolt 7 connects the lower end of the plates together and this bolt and the nuts on the eye bolt act to clamp the plates to the axle 1 as shown. One of the plates 4 has inturned portions 8 which carry bolts for engaging the bottom edge of the axle for adjusting the clamp vertically with relation to the axle.

A tongue 9 has a hole in its rear end for receiving the eye of the eye bolt and the front end of the tongue is forked as shown at 10 to pivotally receive part 11 which is connected to the pulling vehicle.

A pair of cross bars 12 each having a fork 13 at its rear end which is pivoted to an arm 3 and I prefer to make one prong of the fork detachable from the bar so as to make the parts adjustable. A cross bar 14 is adjustably connected at its end to the front ends of the bars 12 through means of bolts 15 passing through certain holes of a number of holes in the bar 14. A pair of bars 14 connect the tongue with the ends of the bars 12 and 14, the bolts 15 passing through the outer ends of these bars 14 and a bolt 17 connects the inner ends of the bars 16 with the tongue, the bars 16 being adjustably connected to the tongue by the bolt 17 by providing the bars 16 with a number of holes 18. An upstanding bracket 19 is connected to an intermediate part of each of the bars 12 and a bar 20 is connected to each of the brackets one of these being adjustable as to its length as shown generally at 21. A coil spring 22 has its ends connected to the inner ends of the bars 20.

The spring 22 conjunction with the bars 20 act to pull the wheels inwardly while the bar 14 acts to prevent this inward movement and this arrangement avoids shimmying movement of the wheels. As will be seen the pull on the prongs is transmitted to the central part of the axle and by the bars 16 to the ends of the axle through means of the arms 3. The parts are adaptable in width and otherwise so that the hitch can be adjusted to fit different types of trailers and the device has up and down adaptability and adaptability to shift from any angle. The device is very simple and sturdy and can be manufactured to sell at low cost and can be attached and removed by one unskilled with the use of tools.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:

1. A hitch of the class described comprising a tongue, means for attaching the tongue to an axle of a vehicle, forwardly extending members connected to the spindle arms of said vehicle, a cross bar connecting the front ends of said members together, a pair of bars connected to the members, a spring connecting the inner ends of said pairs of bars together, and links connecting the front ends of the aforementioned members with the tongue.

2. In combination with a vehicle having an axle, wheel carrying spindles and an arm connected with each spindle, a clamp connected with the central part of the axle, an eye bolt forming part of the clamp, a tongue having an opening at its rear end for receiving the eye part of the bolt, a forwardly extending member having its rear end pivotally connected to each spindle arm, a cross bar adjustably connected to the forward ends of said members, a pair of bars having their outer ends connected to intermediate portions of the members, a spring connecting the inner ends of the pair of bars together, links connecting the outer ends of the members with the tongue, and means for adjustably connecting the links to the tongue.

In testimony whereof I affix my signature.

JOSEPH E. MACHOLDA.